(12) United States Patent
Glaza

(10) Patent No.: US 8,775,079 B2
(45) Date of Patent: Jul. 8, 2014

(54) METHOD FOR STORING OFF-BOARD NAVIGATION DESTINATION LOCATIONS

(75) Inventor: Mark J. Glaza, Warren, MI (US)

(73) Assignee: General Motors LLC, Detroit, MI (US)

( * ) Notice: Subject to any disclaimer, the term of this patent is extended or adjusted under 35 U.S.C. 154(b) by 955 days.

(21) Appl. No.: 11/482,863

(22) Filed: Jul. 7, 2006

(65) Prior Publication Data

US 2008/0010011 A1 Jan. 10, 2008

(51) Int. Cl.
*G01C 21/34* (2006.01)

(52) U.S. Cl.
USPC .................. 701/533; 340/988; 340/995.19

(58) Field of Classification Search
USPC .................. 701/209, 211, 200, 426, 533; 340/995.19, 988
See application file for complete search history.

(56) References Cited

U.S. PATENT DOCUMENTS

| | | | |
|---|---|---|---|
| 5,922,040 A | 7/1999 | Prabhakaran | |
| 6,553,310 B1 * | 4/2003 | Lopke | 701/213 |
| 6,708,110 B2 | 3/2004 | Stefan et al. | |
| 6,925,378 B2 | 8/2005 | Tzamaloukas | |
| 2002/0169778 A1 * | 11/2002 | Natesan et al. | 707/10 |
| 2003/0236818 A1 | 12/2003 | Bruner et al. | |
| 2004/0030490 A1 * | 2/2004 | Hegedus et al. | 701/200 |
| 2004/0142678 A1 | 7/2004 | Krasner | |
| 2005/0215200 A1 | 9/2005 | Oesterling | |
| 2006/0100776 A1 * | 5/2006 | Weiss et al. | 701/200 |
| 2006/0100779 A1 * | 5/2006 | Vergin | 701/211 |

FOREIGN PATENT DOCUMENTS

| | | |
|---|---|---|
| CN | 1409280 A | 4/2003 |
| DE | 102005044419 A1 | 3/2006 |

OTHER PUBLICATIONS

U.S. Appl. No. 10/293,771, filed Nov. 13, 2002, Hay.
U.S. Appl. No. 11/063,481, filed Feb. 23, 2005, Glaza.
U.S. Appl. No. 11/105,076, filed Apr. 13, 2005, Bicego et al.
U.S. Appl. No. 11/191,584, filed Jul. 28, 2005, Kamdar et al.
U.S. Appl. No. 11/194,308, filed Aug. 1, 2005, Resser.

* cited by examiner

*Primary Examiner* — John Q Nguyen
*Assistant Examiner* — Rodney P King
(74) *Attorney, Agent, or Firm* — Dierker & Associates, P.C.

(57) ABSTRACT

A method for verifying and storing location coordinates includes receiving a verification request at a call center, the verification request including location coordinates. The method further includes determining routability of received location coordinates, and transmitting location information from the call center to an off-board navigation device based on the determination. The method further includes, storing the location information. A system and a computer readable medium including computer program code for verifying and storing location coordinates are also disclosed.

5 Claims, 3 Drawing Sheets

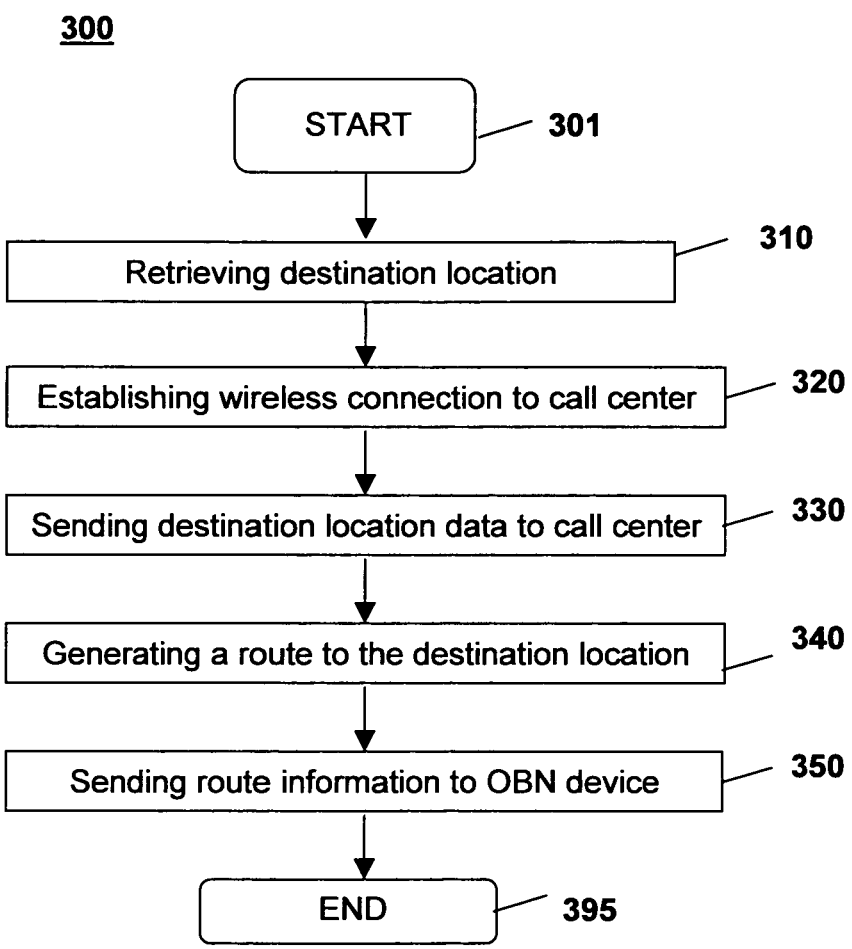

METHOD FOR STORING OFF-BOARD NAVIGATION DESTINATION LOCATIONS

FIELD OF THE INVENTION

The present invention generally relates to navigation systems. More specifically, the present invention relates to a method and system for verifying and storing off-board navigation destination locations.

BACKGROUND OF THE INVENTION

Many passenger vehicles now incorporate an integrated communication system, such as a Mobile Vehicle Communication Units (MVCU), providing a variety of fee-based subscription services in a mobile environment including navigational assistance. The MVCU is typically a vehicle telematics device including a cellular radio, satellite transceiver, and/or global positioning capabilities. Typically, a radio communication link is established between the MVCU and a call center through a wireless network.

Off board navigation (OBN) is a means of providing turn-by-turn directions with a navigation device that obtains a route from a remote source (i.e., transmitted to the MVCU from the call center via the wireless network). Routes are generated then transmitted as route guidance data to a navigation device. One form of route guidance data transmitted to a navigation device for off-board navigation is data derived from a digital map database. Off board navigation devices typically do not have a digital map database resident in the device due to its limited storage capacity. Consequently, the device may not have sufficient data downloaded to autonomously provide routing information with turn-by-turn directions to a stored destination location or point of interest, where a point of interest may be, for example, a hotel, bank, gas station, shopping mall, recreational facility and the like, known in the art. A point of interest becomes a destination location when a user desires to navigate to the point of interest. Additionally, a destination location may be a residence, which is typically not known in the art as a point of interest. Further, a user who would like to return to a destination location or point of interest cannot currently verify and store location information as a navigable destination location or point of interest, for which he can later retrieve turn-by-turn travel directions.

It is an object of this invention, therefore, to provide a method for storing and verifying destination locations for off-board navigation, and to overcome the deficiencies and obstacles described above.

SUMMARY OF THE INVENTION

One aspect of the present invention provides a method of verifying and storing location coordinates, the method includes receiving a verification request at a call center, the verification request including location coordinates. The method further includes determining routability of received location coordinates, and transmitting location information from the call center to an off-board navigation device based on the determination. The method further includes, storing the location information.

Another aspect of the invention provides a computer readable medium for verifying and storing location coordinates, the computer usable medium includes computer readable code for receiving a verification request at a call center, the verification request including location coordinates. The medium further includes computer readable code for determining routability of received location coordinates, and computer readable code for transmitting location information from the call center to an off-board navigation device based on the determination. The medium further includes computer readable code for storing the location information.

Another aspect of the invention provides a system for verifying and storing location coordinates, the system includes means for receiving a verification request at a call center, the verification request including location coordinates. The system further includes means for determining routability of received location coordinates, and means for transmitting location information from the call center to an off-board navigation device based on the determination. The system further includes, means for storing the location information.

The aforementioned and other features and advantages of the invention will become further apparent from the following detailed description of the presently preferred embodiments, read in conjunction with the accompanying drawings. The detailed description and drawings are merely illustrative of the invention rather than limiting the scope of the invention being defined by the appended claims and equivalents thereof.

BRIEF DESCRIPTION OF THE DRAWINGS

FIG. 3 illustrates one embodiment of a method for using the stored off-board navigable destination location.

DETAILED DESCRIPTION OF THE PREFERRED EMBODIMENTS

Figure 1:
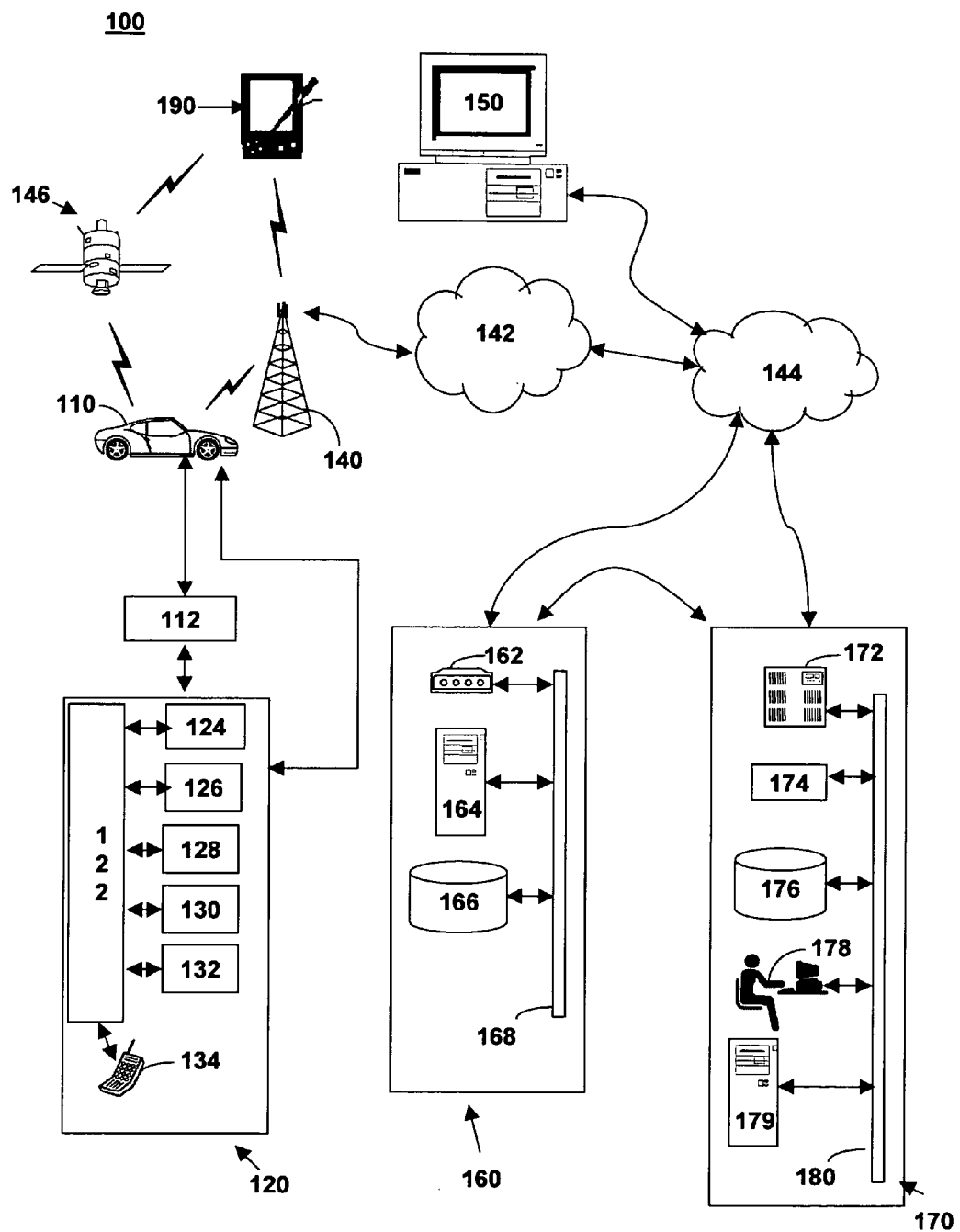
FIG. 1 illustrates one embodiment of a system for verifying and storing current location information as a navigable destination location.

FIG. 1 illustrates a system 100 for verifying and storing an off-board navigation (OBN) destination location. In one embodiment, system 100 includes a mobile vehicle communication unit ("MVCU") 110, a vehicle communication network 112, telematics unit 120, one or more wireless carrier systems 140, one or more communication networks 142, one or more land networks 144, one or more client, personal or user computers 150, one or more web-hosting portals 160, and one or more call centers 170. In one embodiment, MVCU 110 is implemented as a mobile vehicle equipped with suitable hardware and software for transmitting and receiving voice and data communications. MVCS 100 may include additional components not relevant to the present discussion. Mobile vehicle communication systems and telematics units are known in the art.

MVCU 110 is also referred to as a mobile vehicle in the discussion below. In operation, MVCU 110 may be implemented as a motor vehicle, marine vehicle or as an aircraft. MVCU 110 may include additional components not relevant to the present discussion.

Vehicle communication network 112 sends signals to various units of equipment and systems within vehicle 110 to perform various functions such as monitoring the operational state of vehicle systems, collecting and storing data from the vehicle systems, providing instructions, data and programs to various vehicle systems, and calling from telematics unit 120. In facilitating interactions among the various communication and electronic modules, vehicle communication network 112 utilizes interfaces such as controller-area network (CAN), Media Oriented System Transport (MOST), Local Interconnect Network (LIN), Ethernet (10 base T, 100 base T), International Organization for Standardization (ISO) Standard 9141, ISO Standard 11898 for high-speed applications, ISO Standard 11519 for lower speed applications, and Society of Automotive Engineers (SAE) standard J1850 for higher and lower speed applications. In one embodiment, vehicle communication network 112 is a direct connection between connected devices.

Telematics unit 120 sends to and receives radio transmissions from wireless carrier system 140. Wireless carrier system 140 is implemented as any suitable system for transmitting a signal from MVCU 110 to communication network 142. In one embodiment, telematics unit 120 comprises an OBN device. In one embodiment, the telematics unit 120 receives the current latitude and longitude coordinates for the MVCU 110 from the GPS unit 126 and sends the coordinates to the call center 170. In one embodiment telematics unit 120 includes hardware and software for sending and receiving navigation information. In one embodiment, navigation information is sent to and received from call center 170.

Telematics unit 120 includes a processor 122 connected to a wireless modem 124, a global positioning system ("GPS") unit 126, an in-vehicle memory 128 where a route destination directory is stored, a microphone 130, one or more speakers 132, and an embedded or in-vehicle mobile phone 134. The route destination directory comprises, in an example, a list of navigable destination locations. The route destination directory may be configured in any suitable data structure operatively disposed in in-vehicle memory 128. In other embodiments, telematics unit 120 may be implemented without one or more of the above listed components such as, for example, speakers 132. In this example, the vehicle 110 audio system speakers may be used if so equipped. Telematics unit 120 may include additional components not relevant to the present discussion. Telematics unit 120 is one example of a vehicle module.

In another embodiment, system 100 includes OBN device 190. OBN device 190 may be a user laptop computer, a handheld GPS device, or a personal digital assistant (PDA). OBN device 190 includes a wireless modem to send data through a wireless carrier system 140, which connects to communication network 142. OBN device 190 includes in-device memory a route destination directory is stored. Data is received at call center 170. Call center 170 may have any suitable hardware and software capable of providing web services to transmit messages and data signals from OBN device to telematics unit 120 in mobile vehicle 110. OBN device 190 may also have suitable hardware and software to connect to mobile vehicle 110 using a direct link to a mobile vehicle onboard data port.

In one embodiment, processor 122 is implemented as a microcontroller, controller, host processor, or vehicle communications processor. In one embodiment, processor 122 is a digital signal processor. In an example, processor 122 is implemented as an application specific integrated circuit. In another embodiment, processor 122 is implemented as a processor working in conjunction with a central processing unit performing the function of a general-purpose processor. GPS unit 126 provides longitude and latitude coordinates of the vehicle responsive to a GPS broadcast signal received from one or more GPS satellite broadcast systems 146. An OBN device continuously receives current location information as latitude and longitude coordinates via a GPS system 126. In-vehicle mobile phone 134 is a cellular-type phone such as, for example, a digital, dual-mode (e.g., analog and digital), dual-band, multi-mode, or multi-band cellular phone.

Processor 122 executes various computer programs that control programming and operational modes of electronic and mechanical systems within MVCU 110. Processor 122 controls communication (e.g., call signals) between telematics unit 120, wireless carrier system 140, and call center 170. Additionally, processor 122 controls reception of communications from satellite broadcast system 146. In one embodiment, a voice-recognition application is installed in processor 122 that can translate human voice input through microphone 130 to digital signals. Processor 122 generates and accepts digital signals transmitted between telematics unit 120 and vehicle communication network 112 that is connected to various electronic modules in the vehicle. In one embodiment, these digital signals activate the programming mode and operation modes, as well as provide data transfers such as, for example, data over voice channel communication. In this embodiment, signals from processor 122 are translated into voice messages and sent out through speaker 132.

Wireless carrier system 140 is a wireless communications carrier or a mobile telephone system and transmits to and receives signals from one or more MVCU 110. Wireless carrier system 140 incorporates any type of telecommunications in which electromagnetic waves carry signal over part of or the entire communication path. In one embodiment, wireless carrier system 140 is implemented as any type of broadcast communication in addition to satellite broadcast system 146. In another embodiment, wireless carrier system 140 provides broadcast communication to satellite broadcast system 146 for download to MVCU 110. In an example, wireless carrier system 140 connects communication network 142 to land network 144 directly. In another example, wireless carrier system 140 connects communication network 142 to land network 144 indirectly via satellite broadcast system 146.

Satellite broadcast system 146 transmits radio signals to telematics unit 120 within MVCU 110. In one embodiment, satellite broadcast system 146 may broadcast over a spectrum in the "S" band of 2.3 GHz that has been allocated by the U.S. Federal Communications Commission for nationwide broadcasting of satellite-based Digital Audio Radio Service. In operation, broadcast services provided by satellite broadcast system 146 are received by telematics unit 120 located within MVCU 110. In one embodiment, broadcast services include various formatted programs based on a package subscription obtained by the user and managed by telematics unit 120. In another embodiment, broadcast services include various formatted data packets based on a package subscription obtained by the user and managed by call center 170. In an example, processor 122 implements data packets received by telematics unit 120. Data packets include route data and digital map information. In an example, digital map information data packets received by the telematics unit 120 from the call center 170 are implemented by processor 122 to determine a route correction.

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to MVCU 110 and land network 144.

Land network 144 connects communication network 142 to client computer 150, web-hosting portal 160, and call center 170. In one embodiment, land network 144 is a public-switched telephone network. In another embodiment, land network 144 is implemented as an Internet Protocol ("IP") network. In other embodiments, land network 144 is implemented as a wired network, an optical network, a fiber network, other wireless networks, or any combination thereof. Land network 144 is connected to one or more landline telephones. Communication network 142 and land network 144 connect wireless carrier system 140 to web-hosting portal 160 and call center 170.

Client, personal, or user computer 150 includes a computer usable medium to execute Internet browsers and Internet-access computer programs for sending and receiving data over land network 144 and, optionally, wired or wireless communication networks 142 to web-hosting portal 160 through a web-page interface using communication standards such as hypertext transport protocol, and transport-control protocol and Internet protocol. In one embodiment, the data include directives to change certain programming and operational modes of electronic and mechanical systems within MVCU 110.

In operation, a client utilizes computer 150 to initiate setting or re-setting of user preferences for MVCU 110. In an example, a client utilizes computer 150 to provide radio station presets as user preferences for MVCU 110. User-preference data from client-side software is transmitted to server-side software of web-hosting portal 160. In an example, user-preference data are stored at web-hosting portal 160.

Web-hosting portal 160 includes one or more data modems 162, one or more web-servers 164, one or more databases 166, and a network system 168. Web-hosting portal 160 is connected directly by wire to call center 170, or connected by phone lines to land network 144, which is connected to call center 170. In an example, web-hosting portal 160 connects to call center 170 utilizing an IP network. In this example, both components, web-hosting portal 160 and call center 170, are connected to land network 144 utilizing the IP network. In another example, web-hosting portal 160 is connected to land network 144 by one or more data modems 162. Land network 144 sends digital data to and receives digital data from modem 162, data that are then transferred to web server 164. Modem 162 may reside inside web server 164. Land network 144 transmits data communications between web-hosting portal 160 and call center 170.

Web server 164 receives user-preference data from user computer 150 via land network 144. In alternative embodiments, computer 150 includes a wireless modem to send data to web server 164 hosting portal 160 through a wireless communication network 142 and a land network 144. Data are received by land network 144 and sent to one or more web servers 164. In one embodiment, web server 164 is implemented as any suitable hardware and software capable of providing web server 164 services to help change and transmit personal preference settings from a client at computer 150 to telematics unit 120. Web server 164 sends to or receives from one or more databases 166 data transmissions via network system 168. Web server 164 includes computer applications and files for managing and storing personalized settings supplied by the client, such as door lock/unlock behavior, radio station preset selections, climate controls, custom button configurations, and theft alarm settings. For each client, the web server 164 potentially stores hundreds of preferences for wireless vehicle communication, networking, maintenance and diagnostic services for a mobile vehicle. In another embodiment, web server 164 further includes data for managing turn-by-turn navigational instructions.

In one embodiment, one or more web servers 164 are networked via network system 168 to distribute user-preference data among its network components such as databases 166. In an example, database 166 is a part of or a separate computer from web server 164. Web server 164 sends data transmission with user preferences to call center 170 through land network 144.

Call center 170 is a location where many calls are received and serviced at the same time, or where many calls are sent at the same time. In one embodiment, the call center is a telematics call center facilitating communications to and from telematics unit 120. In another embodiment, the call center is a voice call center, providing verbal communications between an advisor in the call center and a subscriber in a mobile vehicle. In yet another embodiment, the call center contains each of these functions. In other embodiments, call center 170 and web server 164 and hosting portal 160 are located in the same or different facilities.

Call center 170 contains one or more voice and data switches 172, one or more communication services managers 174, one or more communication services databases 176, one or more communication services advisors 178, one or more network systems 180, and one or more navigation servers 179.

At least one navigation server 179 is located in call center 170. Navigation server 179 sends to or receives requests from one or more OBN devices 120 or 190 via the wireless communication network 142. The navigation server is any suitable hardware and software capable of generating and then transmitting route guidance data to an OBN device. One form of route guidance data transmitted to a navigation device for off-board navigation is data derived from a digital map database. Navigation server includes at least one digital map database.

Switch 172 of call center 170 connects to land network 144. Switch 172 transmits voice or data transmissions from call center 170, and receives voice or data transmissions from telematics unit 120 in MVCU 110 through wireless carrier system 140, communication network 142, and land network 144. Switch 172 receives data transmissions from and sends data transmissions to one or more web server 164 and hosting portals 160. Switch 172 receives data transmissions from or sends data transmissions to one or more communication services managers 174 via one or more network systems 180.

Communication services manager 174 is any suitable hardware and software capable of providing requested communication services to telematics unit 120 in MVCU 110. Communication services manager 174 sends to or receives from one or more communication services databases 176 data transmission via network system 180. In one embodiment, communication services manager 174 includes at least one analog and/or digital modem.

Communication services manager 174 sends to or receives from one or more communication services advisors 178 data transmission via network system 180. Communication services database 176 sends or receives from communication services advisor 178 data transmissions via network system 180. Communication services advisor 178 receives from or sends to switch 172 voice or data transmissions. Communication services manager 174 provides one or more of a variety of services including initiating data over voice channel wireless communication, enrollment services, navigation assistance, directory assistance, roadside assistance, business or residential assistance, information services assistance, emergency assistance, and communications assistance.

Communication services manager 174 receives service-preference requests for a variety of services from the client computer 150, web server 164, hosting portal 160, and land network 144. Communication services manager 174 transmits user-preference and other data such as, for example, primary diagnostic script to telematics unit 120 through wireless carrier system 140, communication network 142, land network 144, voice and data switch 172, and network system 180. Communication services manager 174 stores or retrieves data and information from communication services database 176. Communication services manager 174 may provide requested information to communication services advisor 178. In one embodiment, communication services advisor 178 is implemented as a real advisor. In an example, a real advisor is a human being in verbal communication with a user or subscriber (e.g., a client) in MVCU 110 via telematics unit 120. In another embodiment, communication services advisor 178 is implemented as a virtual advisor. In an example, a virtual advisor is implemented as a synthesized voice interface responding to requests from telematics unit 120 in MVCU 110.

Communication services advisor 178 provides services to telematics unit 120 in MVCU 110. Services provided by communication services advisor 178 include enrollment services, navigation assistance, real-time traffic advisories, directory assistance, roadside assistance, business or residential assistance, information services assistance, emergency assistance, automated vehicle diagnostic function, and communications assistance. Communication services advisor 178 communicates with telematics unit 120 in MVCU 110 through wireless carrier system 140, communication network 142, and land network 144 using voice transmissions, or through communication services manager 174 and switch 172 using data transmissions. Switch 172 selects between voice transmissions and data transmissions.

In operation, an incoming call is routed to a telematics unit 120 within mobile vehicle 110 from call center 170. In one embodiment, the call is routed to telematics unit 120 from call center 170 via land network 144, communication network 142, and wireless carrier system 140. In another embodiment, an outbound communication is routed to telematics unit 120 from call center 170 via land network 144, communication network 142, wireless carrier system 140, and satellite broadcast system 146. In this embodiment, an inbound communication is routed to call center 170 from telematics unit 120 via wireless carrier system 140, communication network 142, and land network 144.

Figure 2:
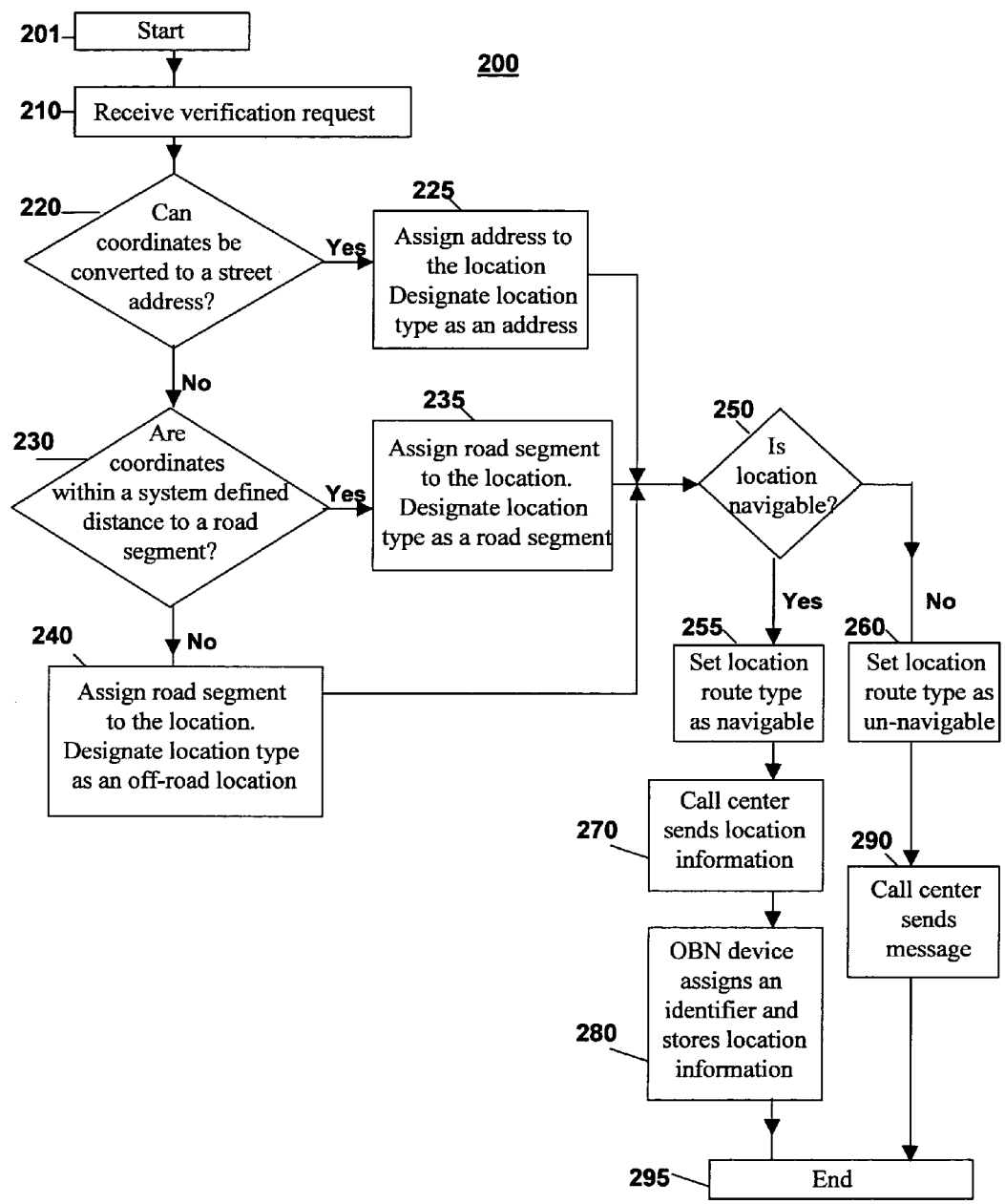
FIG. 2 illustrates one embodiment of a method for verifying and storing current location information as a navigable destination location.

FIG. 2 illustrates one embodiment of a method 200 for verifying and storing a destination location in accordance with the instant invention. The OBN device sends location coordinates to the call center to verify before saving them in the route destination directory. Method 200 begins at 201.

At step 210, a verification request is received at a call center 170 from OBN device 120, 190. In one embodiment, a user initiates the verification request via a verbal or push-button command. Upon initiating the verification request, the OBN device establishes a wireless connection to the call center 170. In one embodiment the verification request includes sending the latitude and longitude coordinates of the current location to the call center.

After receiving the verification request, the call center determines whether the received coordinates can be converted to a street address, at step 220. In one embodiment, converting the received latitude and longitude coordinates to a street address comprises reverse geo-coding. If the coordinates can be converted to a street address, the street address is assigned to the location and the location is designated as a street address, at step 225. Otherwise if the coordinates cannot be converted to a street address, the call center determines whether the coordinates are within a system defined distance to a road segment, at step 230, where a road segment, for example, is a collection of latitude and longitude values that describe the geometry of a road typically between intersections. If the coordinates are within a system defined distance to a road segment, the road segment is assigned to the location and the location type is designated as a road segment, at step 235. Otherwise, if the coordinates are not within a system defined distance to a road segment, the nearest road segment is assigned to the location and designate the location type as an off-road location, at step 240. The system defined distance to a road segment is, in one example, configurable, wherein the distance may be variable.

At step 250, method 200 determines whether the designated location type received from one of steps 225, 235, or 240 is navigable. Based on this determination, the location route type is set to either navigable (step 255) or unnavigable (step 260).

Next, if the location route type is determined to be navigable at step 250, the call center sends a message containing the location information to the OBN device over the wireless network, at step 270. The location information includes the location type, location route type and, where available, the street address or road segment.

The OBN device 120, 190 then assigns an identifier for the destination location and location information and then stores the location information (latitude and longitude coordinates of the location, the location type, the location route type, and, where available, the street address or road segment) and identifier, at step 280. The identifier may be a voice tag or character string identifier.

In one embodiment, the OBN device provides an indication that the location was stored. The provided indication may be an audible signal or a text message displayed on a display screen. In one embodiment, the OBN device plays an audio message over speakers 132 that the location is stored.

If the location route type is determined to not be navigable at step 250, the call center sends a message to the OBN device indicating that the location route type is unnavigable, at step 290. In this embodiment, the location is not stored.

In one embodiment, the OBN device provides an indication that the location was not stored. The provided indication may be an audible signal or a text message displayed on a display screen. In one embodiment, OBN device plays an audio message over speakers 132 that the location is not stored.

Method 200 ends at step 295.

FIG. 3 illustrates one embodiment of a method 300 for using the destination location verified and stored using method 200. Method 300 provides a navigable route in accordance with the instant invention. Method 300 begins at 301.

At step 310, the OBN device 120, 190 retrieves the destination location information by indexing the assigned identifier. At step 320, the OBN device establishes a wireless connection to the call center. The retrieved destination location information is sent to the call center navigation server as a destination for an OBN route at step 330. The call center generates a navigable route to the destination location, at step 340. Next, the call center sends route information to an OBN device at step 350. In one embodiment, the route information comprises turn-by-turn navigation instructions to the destination location. Method 300 ends at step 395. While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method of verifying and storing location coordinates, the method comprising:
   receiving a verification request at a call center, the verification request including location coordinates;
   determining, via a navigation server running computer readable code encoded on a non-transitory computer readable medium, routability of received location coordinates by:
      classifying the received location coordinates as a location type selected from i) a street address, ii) a road segment, and iii) an off-road location;
      determining whether the location type is navigable via a vehicle; and
      classifying the location type as navigable or not navigable;
   from the determining, identifying that the location type is not navigable via the vehicle;
   providing a message that the location type is not navigable; and
   indicating that the location type has not been stored as a result of it being not navigable.

2. The method of claim 1, wherein determining whether the classified location type is navigable includes determining whether a route can be generated to the location.

3. A non-transitory computer usable medium including a program having computer readable code embodied therein for verifying and storing location coordinates, the computer readable code configured for:
   receiving a verification request at a call center, the verification request including location coordinates;
   determining routability of received location coordinates by:
      classifying the received location coordinates as a location type selected from i) a street address, ii) a road segment, and iii) an off-road location;
      determining whether the location type is navigable via a vehicle; and
      classifying the location type as navigable or not navigable;
   wherein when a determination is made that the location type is not navigable via the vehicle, the computer readable code is further configured for:
   providing a message that the location type is not navigable; and
   indicating that the location type has not been stored as a result of it being not navigable.

4. The computer usable medium of claim 3, wherein the computer readable code for verifying the location coordinates comprises computer readable code for determining whether a route can be generated to the location.

5. A system for verifying and storing location coordinates, the system comprising:
   means for receiving a verification request at a call center, the verification request including location coordinates;
   means for determining routability of received location coordinates including:
      means for classifying the received location coordinates as a location type selected from i) a street address, ii) a road segment, and iii) an off-road location;
      means for determining whether the location type is navigable via a vehicle; and
      means for classifying the location type as navigable or not navigable;
   means for providing a message that the location type is not navigable; and
   means for indicating that the location type has not been stored as a result of it being not navigable.

* * * * *